US012495385B2

United States Patent
Ren et al.

(10) Patent No.: US 12,495,385 B2
(45) Date of Patent: Dec. 9, 2025

(54) POSITIONING METHOD AND APPARATUS BASED ON DOWNLINK (DL) CHANNEL INFORMATION, AND DEVICE

(71) Applicant: DATANG MOBILE COMMUNICATIONS EQUIPMENT CO., LTD., Beijing (CN)

(72) Inventors: Bin Ren, Beijing (CN); Ren Da, Beijing (CN); Hui Li, Beijing (CN); Xiaotao Ren, Beijing (CN); Qiubin Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 273 days.

(21) Appl. No.: 18/261,016

(22) PCT Filed: Feb. 9, 2022

(86) PCT No.: PCT/CN2022/075736
§ 371 (c)(1),
(2) Date: Jul. 11, 2023

(87) PCT Pub. No.: WO2022/188586
PCT Pub. Date: Sep. 15, 2022

(65) Prior Publication Data
US 2024/0064687 A1 Feb. 22, 2024

(30) Foreign Application Priority Data
Mar. 9, 2021 (CN) .......................... 202110258366.9

(51) Int. Cl.
*H04W 64/00* (2009.01)
*H04B 7/06* (2006.01)
(Continued)

(52) U.S. Cl.
CPC .......... *H04W 64/00* (2013.01); *H04B 7/0626* (2013.01); *H04B 17/328* (2023.05); *H04W 72/54* (2023.01)

(58) Field of Classification Search
CPC ... H04W 64/00; H04W 64/006; H04W 72/54; Y02D 30/70; H04L 5/005; H04L 5/0051;
(Continued)

(56) References Cited

U.S. PATENT DOCUMENTS

2017/0171857 A1   6/2017   Lee et al.
2018/0270784 A1   9/2018   Lee et al.
(Continued)

FOREIGN PATENT DOCUMENTS

CN   110651512 A   1/2020
CN   111562546 A   8/2020
(Continued)

OTHER PUBLICATIONS

Extended Search Report issued Aug. 27, 2024 for European Application 22766113.9.
(Continued)

*Primary Examiner* — Siu M Lee
(74) *Attorney, Agent, or Firm* — Harness, Dickey & Pierce, P.L.C.

(57) ABSTRACT

A method for positioning based on downlink (DL) channel information includes: sending a positioning assistance data request message to a core network device, in which the positioning assistance data request message includes the DL channel information; receiving positioning assistance data sent by the core network device, in which the positioning assistance data includes DL PRS resource information, the DL PRS resource information is determined by an access network device based on first estimated location information of the UE forwarded by the core network device, and the first (Continued)

estimated location information is determined by the core network device based on the DL channel information; obtaining a DL positioning measurement by measuring a DL PRS based on the DL PRS resource information, and sending the DL positioning measurement to the core network device.

20 Claims, 9 Drawing Sheets

(51) Int. Cl.
*H04B 17/318* (2015.01)
*H04W 72/54* (2023.01)

(58) Field of Classification Search
CPC ... H04L 5/0092; G01S 5/0036; G01S 5/0236; H04B 7/0626; H04B 17/328
See application file for complete search history.

(56) References Cited

U.S. PATENT DOCUMENTS

| | | |
|---|---|---|
| 2019/0166452 A1 | 5/2019 | Tenny |
| 2019/0353746 A1 | 11/2019 | Razavi et al. |
| 2019/0380054 A1 | 12/2019 | Manolakos et al. |
| 2020/0264261 A1* | 8/2020 | Akkarakaran .......... H04W 8/24 |
| 2020/0374850 A1 | 11/2020 | Khoryaev et al. |
| 2022/0150866 A1* | 5/2022 | Ren ....................... H04B 7/0617 |
| 2022/0231805 A1* | 7/2022 | Bao ....................... H04W 64/003 |

FOREIGN PATENT DOCUMENTS

| | | |
|---|---|---|
| CN | 111756494 A | 10/2020 |
| CN | 112333624 A | 2/2021 |
| WO | 2020/164361 A1 | 8/2020 |
| WO | 2020/215883 A1 | 10/2020 |
| WO | WO-20201/93853 A1 | 10/2020 |

OTHER PUBLICATIONS

International Search Report and Written Opinion issued on Apr. 11, 2022 in International application PCT/CN2022/075736.
Qualcomm Inc., "Various Corrections to NR Positioning," 3GPP tsg_ran\wg2_rl2 R2-2003348, Apr. 9, 2020.
First Office Action for Chinese application 202110258366.9 issued May 9, 2024 along with English translation.
Examination Report for Indian application 202327045841 issued Jun. 12, 2024.

* cited by examiner

POSITIONING METHOD AND APPARATUS BASED ON DOWNLINK (DL) CHANNEL INFORMATION, AND DEVICE

CROSS REFERENCE TO RELATED APPLICATIONS

This application is a U.S. national phase of International Application No. PCT/CN2022/075736, filed with the State Intellectual Property Office of P. R. China on Feb. 9, 2022, which claims priority to Chinese patent application No. 202110258366.9, filed on Mar. 9, 2021, the entire contents of which are incorporated herein by reference.

TECHNICAL FIELD

The disclosure relates to the field of mobile communication technology, in particular to a method for positioning based on Downlink (DL) channel information, an apparatus for positioning based on DL channel information and a device.

BACKGROUND

In the related art, in a positioning process of a User Equipment (UE), Location Management Function (LMF) needs to obtain positioning configuration information associated with a Downlink (DL) Positioning Reference Signal (PRS) of each base station through specified positioning protocols. The LMF provides the DL PRS configuration information of each base station to the UE as positioning assistance information through the positioning protocols.

Currently, Third Generation Partnership Project (3GPP) New Radio (NR) standard does not yet support the UE to provide existing DL channel information to the LMF at the beginning of the positioning process.

SUMMARY

According to a first aspect, a method for positioning based on DL channel information, applied to a UE, is provided. The method includes:
  sending a positioning assistance data request message to a core network device, in which the positioning assistance data request message includes the DL channel information;
  receiving positioning assistance data sent by the core network device, in which the positioning assistance data includes DL PRS resource information, the DL PRS resource information is determined by an access network device based on first estimated location information of the UE forwarded by the core network device, and the first estimated location information is determined by the core network device based on the DL channel information;
  obtaining a DL positioning measurement by measuring a DL PRS based on the DL PRS resource information; and
  sending the DL positioning measurement to the core network device.

According to a second aspect, a method for positioning based on DL channel information, applied to a core network device is provided. The method includes:
  receiving a positioning assistance data request message sent by a UE, in which the positioning assistance data request message includes the DL channel information;
  determining first estimated location information of the UE based on the DL channel information;
  sending a positioning information request message to an access network device, in which the positioning information request message includes the first estimated location information;
  receiving a positioning information response message sent by the access network device, in which the positioning information response message includes DL PRS resource information, and the DL PRS resource information is determined by the access network device based on the first estimated location information;
  sending positioning assistance data to the UE, in which the positioning assistance data includes the DL PRS resource information;
  receiving a DL positioning measurement reported by the UE; and
  obtaining second estimated location information of the UE by calculating based on the DL positioning measurement.

According to a third aspect, a method for positioning based on DL channel information, applied to an access network device is provided. The method includes:
  receiving a positioning information request message sent by a core network device, in which the positioning information request message includes first estimated location information;
  determining DL PRS resource information based on the first estimated location information; and
  sending a positioning information response message to the core network device, in which the positioning information response message includes the DL PRS resource information.

According to a fourth aspect, a UE is provided. The UE includes: a memory, a transceiver, and a processor.

The memory is configured to store computer programs, the transceiver is configured to send and receive data under control of the processor, and the processor is configured to read the computer programs in the memory and perform the following operations:
  sending a positioning assistance data request message to a core network device, in which the positioning assistance data request message includes DL channel information;
  receiving positioning assistance data sent by the core network device, in which the positioning assistance data includes DL PRS resource information, the DL PRS resource information is determined by an access network device based on first estimated location information of the UE forwarded by the core network device, and the first estimated location information is determined by the core network device based on the DL channel information;
  obtaining a DL positioning measurement by measuring a DL PRS based on the DL PRS resource information; and
  sending the DL positioning measurement to the core network device.

According to a fifth aspect, a network side device is provided. The network side device includes: a memory, a transceiver, and a processor.

The memory is configured to store computer programs, the transceiver is configured to send and receive data under control of the processor, and the processor is configured to read the computer programs in the memory and perform the following operations:

receiving a positioning assistance data request message sent by a UE, in which the positioning assistance data request message includes DL channel information;

determining first estimated location information of the UE based on the DL channel information;

sending a positioning information request message to an access network device, in which the positioning information request message includes the first estimated location information;

receiving a positioning information response message sent by the access network device, in which the positioning information response message includes DL PRS resource information, and the DL PRS resource information is determined by the access network device based on the first estimated location information;

sending positioning assistance data to the UE, in which the positioning assistance data includes the DL PRS resource information;

receiving a DL positioning measurement reported by the UE; and obtaining second estimated location information of the UE by calculating based on the DL positioning measurement.

According to a sixth aspect, a network side device is provided. The network side device includes: a memory, a transceiver, and a processor.

The memory is configured to store computer programs, the transceiver is configured to send and receive data under control of the processor, and the processor is configured to read the computer programs in the memory and perform the following operations:

receiving a positioning information request message sent by a core network device, in which the positioning information request message includes first estimated location information;

determining DL PRS resource information based on the first estimated location information;

and sending a positioning information response message to the core network device, in which the positioning information response message includes the DL PRS resource information.

According to a seventh aspect, a processor-readable storage medium having computer programs stored thereon is provided. The computer programs are configured to cause a processor to implement the method of the first aspect, the second aspect, or the third aspect of the embodiments.

DETAILED DESCRIPTION

The following description of exemplary embodiments of the disclosure is provided with reference to the accompanying drawings, which includes various details of the embodiments of the disclosure to aid in understanding, and should be considered merely exemplary. For the sake of clarity and brevity, descriptions of well-known functions and structures are omitted from the following description.

A method for positioning based on DL channel information, an apparatus for positioning based on DL channel information, a device and a medium are described below with reference to the accompanying drawings.

In the related art, during a positioning process of the User Equipment (UE), Location Management Function (LMF) needs to obtain positioning configuration information associated with a Downlink (DL) Positioning Reference Signal (PRS) of each base station through specified positioning protocols. The LMF provides the DL PRS configuration information of each base station to the UE as the positioning assistance information through the positioning protocols.

In this positioning method, the LMF sends the positioning configuration information containing all DL PRSs to the UE, but there may be some DL PRSs cannot be detected by the UE, thereby causing waste of time-frequency resources.

In an embodiment of the disclosure, the UE sends the DL channel information to a core network device through a positioning assistance data request message, and the core network device determines approximate location information of the UE based on the DL channel information and notifies an access network device of the approximate location information of the UE. The access network device optimally determines the DL PRS resource information based on the approximate location information of the UE, so that the core network device provides the UE with information of a DL PRS that is possible to be detected by the UE, which not only avoids wasting the time-frequency resources to transmit information of a DL PRS that cannot be detected by the UE to the UE, which saves the time-frequency resources, but also enables the UE to reduce time and power consumption for measuring the DL PRS.

Figure 1:
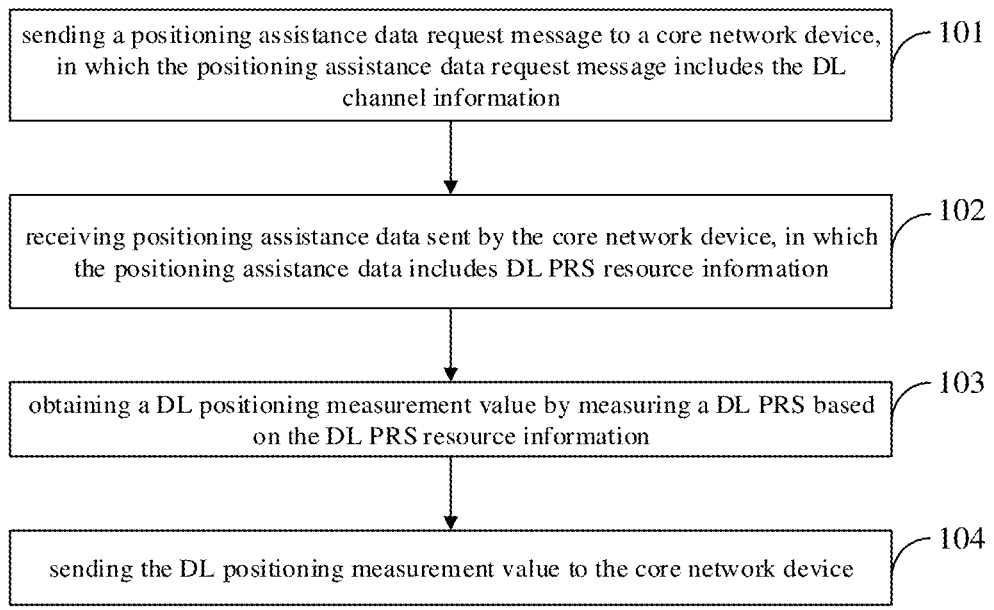
FIG. 1 is a flowchart of a method for positioning based on Downlink (DL) channel information according to an embodiment of the disclosure.

FIG. 1 is a flowchart of a method for positioning based on DL channel information according to an embodiment of the disclosure. The method for positioning based on DL channel information may be applied to a UE.

As illustrated in FIG. 1, the method for positioning based on DL channel information includes the following steps.

At step 101, the UE sends a positioning assistance data request message to a core network device, the positioning assistance data request message includes the DL channel information.

In the disclosure, when the UE initiates a positioning service, i.e., when the UE determines that positioning assistance data is required, the UE sends the positioning assistance data request message to the core network device. The positioning assistance data request message may include the DL channel information.

The DL channel information can be one or more of a DL channel information parameter, a DL Channel State Information (CSI) parameter, or DL CSI parameter indication information. The DL CSI parameter indication information is configured to indicate the core network device to obtain the DL CSI parameter from an access network device accessed by the UE. That is, in the case that the DL channel information fed back by the UE to the core network device is the DL CSI parameter indication information, the core network device may obtain the DL CSI parameter from the access network device accessed by the UE.

In the disclosure, the UE may be a device such as a cell phone, a wearable device, a vehicle terminal. The core network device may be an LMF. The access network device may be a base station.

The UE sends the DL channel information to the core network device through the positioning assistance data request message, and the core network device can determine approximate location information of the UE based on the DL channel information. The approximate location information is referred to here as first estimated location information for ease of distinction.

At step 102, the UE receives positioning assistance data sent by the core network device, the positioning assistance data includes DL PRS resource information.

In the disclosure, the core network device may send the positioning assistance data requested by the UE to the UE, and the UE receives the positioning assistance data sent by the core network device. The positioning assistance data may include the DL PRS resource information, which is determined by the access network device based on the first estimated location information of the UE forwarded by the core network device.

The DL PRS resource information may include one or more of the followings: quantity, a cycle, a bandwidth, and beam information of a DL PRS resource.

Since the DL PRS resource information is determined by the access network device based on the first estimated location information of the UE, the DL PRS resource information obtained by the UE includes information of a DL PRS that is possible to be detected by the UE.

At step 103, the UE obtains a DL positioning measurement by measuring a DL PRS based on the DL PRS resource information.

In the disclosure, the UE may measure the DL PRS based on DL PRS resource information to obtain the DL positioning measurement.

The DL positioning measurement is related to a positioning algorithm used. For example, the DL positioning measurement may be a downlink Reference Signal Time Difference (DL RSTD) used for downlink Time Difference Of Arrival (DL-TDOA) positioning, or the DL positioning measurement can be a Reference Signal Received Power (RSRP) used for a downlink Angle of Departure (DL-AoD).

Since the DL PRS resource information includes information of the DL PRS that is possible to be detected by the UE, measuring the DL PRS based on the DL PRS resource information can prevent the UE from measuring a DL PRS that cannot be detected by the UE, thereby reducing time and power consumption for the UE to measure the DL PRS.

At step 104, the UE send the DL positioning measurement to the core network device.

In the disclosure, the UE may send the DL positioning measurement to the core network device, and the core network device may determine exact location information of the UE based on the DL positioning measurement. The exact location information is referred to herein as second estimated location information for ease of distinction.

In the embodiment of the disclosure, the UE sends the positioning assistance data request message to the core network device, the positioning assistance data request message includes the DL channel information. The UE receives the positioning assistance data sent by the core network device, the positioning assistance data includes the DL PRS resource information, and the DL PRS resource information is determined by the access network device based on the first estimated location information of the UE forwarded by the core network device. The UE measures the DL PRS based on the DL PRS resource information to obtain the DL positioning measurement, and sends the DL positioning measurement to the core network device. In this way, during positioning, the UE sends the DL channel information to the core network device through the positioning assistance data request message, and the core network device determines the approximate location information of the UE based on the DL channel information and notifies the access network device of the approximate location information of the UE. The access network device optimally determines the DL PRS resource information based on the approximate location information of the UE, so that the core network device provides the UE with information of a DL PRS that is possible to be detected by the UE, which not only avoids wasting time-frequency resources to transmit information of a DL PRS that cannot be detected by the UE to the UE, which saves the time-frequency resources, but also enables the UE to reduce the time and power consumption for measuring the DL PRS.

In some embodiments of the disclosure, when the UE sends the positioning assistance data request message to the core network device, it may select a DL channel information parameter and/or a DL CSI parameter of one or more of received radio beams for feedback.

In some embodiments, the UE may determine a target wireless beam based on a RSRP of each of the received wireless beams, and send a DL channel information parameter and/or a DL CSI parameter corresponding to the target wireless beam to the core network device via the positioning assistance data request message. For example, the UE receives 5 wireless beams, it can select 3 wireless beams with the strongest RSRP and feeds the DL channel information parameter and the DL CSI parameter corresponding to each of these 3 wireless beams back to the core network device.

In some embodiments of the disclosure, the UE may estimate the DL channel information parameter and/or the DL CSI parameter of the received wireless beam based on configured downlink reference signal, such as a Channel State Information Reference Signal (CSI-RS), before sending the positioning assistance data request message to the core network device.

In some embodiments of the disclosure, the DL channel information fed back by the UE to the core network device can be the DL channel information parameter. The DL channel information parameter includes at least one of the followings: a wireless channel Path Loss (PL), a wireless beam signal received Signal-to-Noise Ratio (SNR), and a wireless beam signal RSRP.

In some embodiments of the disclosure, the DL channel information fed back by the UE to the core network device can be the DL CSI parameter. The DL CSI parameter includes at least one of the followings: a Precoding Matrix Indicator (PMI), a downlink Channel State Information Reference Signal Resource Indicator (CRI), and a Synchronization Signal Block Resource Indicator (SSBRI).

Figure 2:
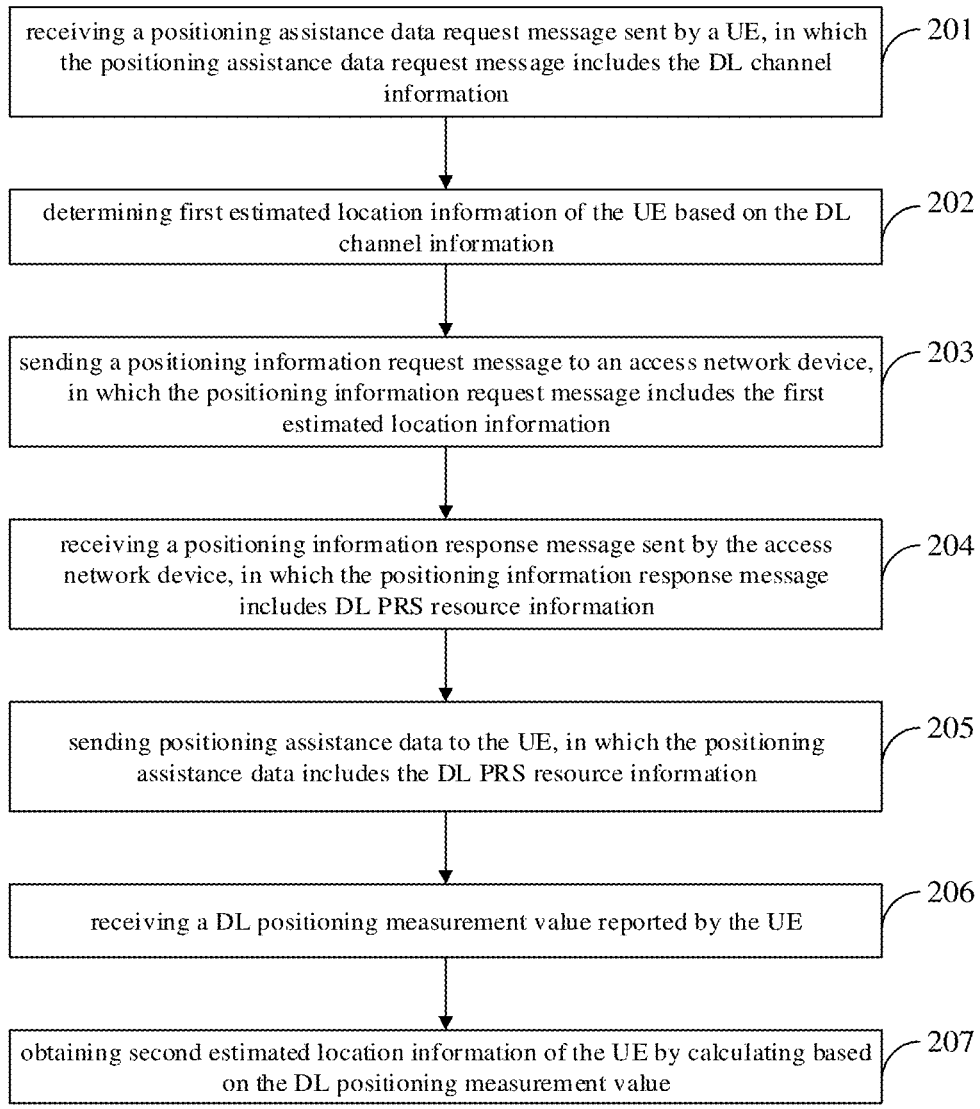
FIG. 2 is a flowchart of a method for positioning based on DL channel information according to an embodiment of the disclosure.

FIG. 2 is a flowchart of a method for positioning based on DL channel information according to an embodiment of the disclosure. The method for positioning based on DL channel information is applied to a core network device.

As illustrated in FIG. 2, the method for positioning based on DL channel information includes the following steps.

At step 201, the core network device receives a positioning assistance data request message sent by a UE, the positioning assistance data request message includes the DL channel information.

In the disclosure, when the UE initiates a positioning service, i.e., when the UE determines that positioning assistance data is required, the UE sends the positioning assistance data request message to the core network device, so that the core network device can receive the positioning assistance data request message sent by the UE. The positioning assistance data request message may include the DL channel information.

The DL channel information includes at least one of the followings: a DL channel information parameter, a DL CSI parameter, or DL CSI parameter indication information. The DL CSI parameter indication information is configured to indicate the core network device to obtain the DL CSI parameter from an access network device accessed by the UE. That is, in the case that the DL channel information fed back by the UE to the core network device is the DL CSI parameter indication information, the core network device may obtain the DL CSI parameter from the access network device accessed by the UE.

In some embodiments, the DL channel information parameter includes at least one of the followings: a wireless channel PL, a wireless beam signal received SNR, and a wireless beam signal RSRP.

In the disclosure, the UE can be a cell phone, a wearable device, and a vehicle terminal, and the core network device can be an LMF.

At step 202, the core network device determines first estimated location information of the UE based on the DL channel information.

The core network device can obtain information related to UE positioning based on the DL channel information, such as a downlink Angle of Arrival (AoA) of the UE, a DL AoD of a Transmission-Reception Point (TRP), a propagation distance, etc. The core network device may determine the first estimated location information of the UE based on the obtained information related to UE positioning.

At step 203, the core network device sends a positioning information request message to an access network device, the positioning information request message includes the first estimated location information.

In the disclosure, after determining the first estimated location information, the core network device may send the positioning information request message to the access network device. The positioning information request message includes the first estimated location information.

At step 204, the core network device receives a positioning information response message sent by the access network device, the positioning information response message includes DL PRS resource information.

In the disclosure, the access network device may receive the positioning information request message sent by the core network device, and determine the DL PRS resource information based on the first estimated location information, and then send the positioning information response message to the core network device.

The core network device may receive the positioning information response message sent by the access network device. The positioning information response message includes the DL PRS resource information, and the DL PRS resource information is determined by the access network device based on the first estimated location information.

The DL PRS resource information may include one or more of the followings: quantity, a cycle, a bandwidth, and beam information of a DL PRS resource.

At step 205, the core network device sends positioning assistance data to the UE, the positioning assistance data includes the DL PRS resource information.

In the disclosure, after the core network device obtains the positioning information response message sent by the access network device, it may send the positioning assistance data to the UE. The positioning assistance data may include the DL PRS resource information.

Since the DL PRS resource information is determined by the access network device based on the first estimated location information of the UE, the DL PRS resource information includes information of a DL PRS that is possible to be detected by the UE. Thus the core network device sends the information of the DL PRS that is possible to be detected by the UE to the UE, to avoid sending information of a DL PRS that cannot be detected by the UE to the UE, i.e., the redundant information of the DL PRS to the UE, thereby saving the time-frequency resources.

At step 206, the core network device receives a DL positioning measurement reported by the UE.

The UE receives the positioning information response message sent by the core network device and measures a DL PRS according to the DL PRS resource information in the positioning information response message to obtain the DL positioning measurement, and then sends the DL positioning measurement to the core network device. The core network device can receive the DL positioning measurement reported by the UE.

The DL positioning measurement is related to a positioning algorithm used. For example, the DL positioning measurement can be a DL RSTD used for a DL-TDOA, or a RSRP used for a DL-AoD.

At step 207, the core network device obtains second estimated location information of the UE by calculating based on the DL positioning measurement.

The core network device can calculate the second estimated location information of the UE based on the DL positioning measurement. For example, a positioning algorithm used is a DL-TDOA algorithm, and the DL positioning measurement is DL RSTD, then the core network device may determine the second estimated location information of the UE based on the DL RSTD.

In the embodiment of the disclosure, the core network device receives the positioning assistance data request message sent by the UE, the positioning assistance data request message includes the DL channel information. The core network device determines the first estimated location information of the UE based on the DL channel information. The core network device sends the positioning information request message to the access network device, the positioning information request message includes the first estimated location information. The core network device receives the positioning information response message sent by the access network device, the positioning information response message includes the DL PRS resource information. The DL PRS resource information is determined by the access network device based on the first estimated location information. The core network device sends the positioning assistance data to the UE, the positioning assistance data includes the DL PRS resource information. The core network device receives the DL positioning measurement reported by the UE. The core network device obtains the second estimated location information of the UE by calculating based on the DL positioning measurement. Therefore, the core network device can determine approximate location information of the UE based on the DL channel information fed back by the UE and notify the access network device of the approximate location information of the UE, and the access network device optimally determines the DL PRS resource information based on the approximate location information of the UE, so that the core network device provides the UE with information of a DL PRS that is possible to be detected by the UE, which not only avoids wasting time-frequency resources to transmit information of a DL PRS that cannot be detected by the UE to the UE, which saves the time-frequency resources, but also enables the UE to reduce time and power consumption for measuring the DL PRS.

Figure 3:
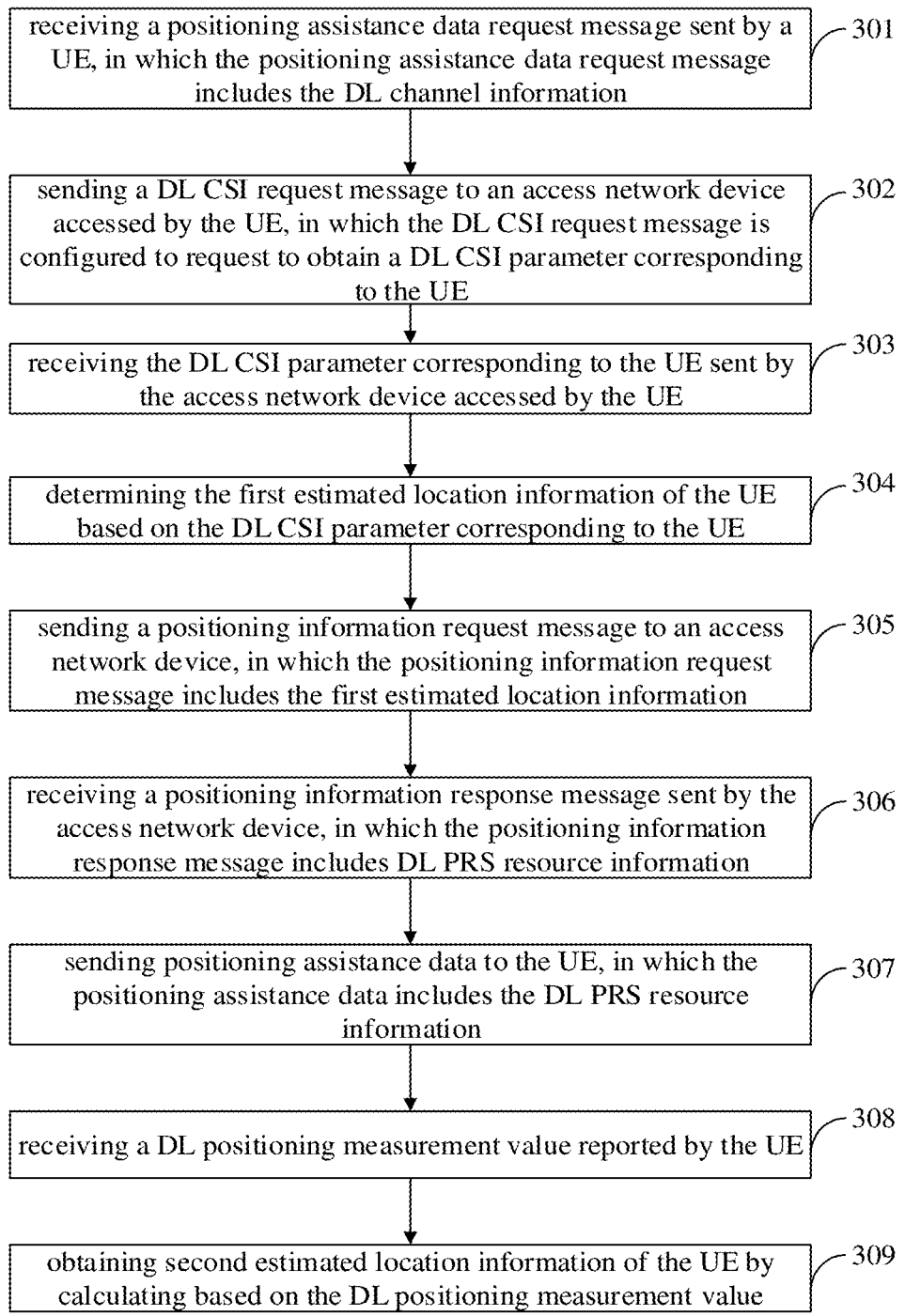
FIG. 3 is a flowchart of a method for positioning based on DL channel information according to an embodiment of the disclosure.

FIG. 3 is a flowchart of a method for positioning based on DL channel information according to an embodiment of the disclosure. The method for positioning based on DL channel information is applied to a core network device.

As illustrated in FIG. 3, the method for positioning based on DL channel information includes the following steps.

At step 301, the core network device receives a positioning assistance data request message sent by a UE, the positioning assistance data request message includes the DL channel information.

In the disclosure, when the UE initiates a positioning service, i.e., when the UE determines that positioning assistance data is required, it may send the positioning assistance data request message to the core network device, and the core network device may receive the positioning assistance data request message sent by the UE. The positioning assistance data request message may include the DL channel information. The DL channel information is DL CSI parameter indication information, and the DL CSI parameter indication information is used to indicate the core network device to obtain a DL CSI parameter from an access network device accessed by the UE.

That is, in the case where the DL channel information received by the core network device is the DL CSI parameter indication information, the core network device may obtain the DL CSI parameter from the access network device accessed by the UE.

At step 302, the core network device sends a DL CSI request message to the access network device accessed by the UE, the DL CSI request message is configured to request to obtain a DL CSI parameter corresponding to the UE.

In the disclosure, the DL channel information received by the core network device is the DL CSI parameter indication information. Since the DL CSI parameter indication information is used to indicate the core network device to obtain the DL CSI parameter from the access network device accessed by the UE, the core network device may send the DL CSI request message to the access network device accessed by the UE to request for the DL CSI parameter. The DL CSI request message is used to request for the DL CSI parameter corresponding to the UE.

At step 303, the core network device receives the DL CSI parameter corresponding to the UE sent by the access network device accessed by the UE.

In the disclosure, the access network device accessed by the UE receives the DL CSI request message sent by the core network device, determines the DL CSI parameter corresponding to the UE according to the DL CSI request message, and sends the DL CSI parameter corresponding to the UE to the core network device. The core network device receives the DL CSI parameter corresponding to the UE from the access network device accessed by the UE.

In some embodiments, the DL CSI parameter includes at least one of the followings: a PMI, a downlink CRI, and a SSBRI.

At step 304, the core network device determines first estimated location information of the UE based on the DL CSI parameter corresponding to the UE.

In the disclosure, the core network device may determine the first estimated location information of the UE based on the DL CSI parameter corresponding to the UE.

For example, the DL CSI parameter includes a PMI, a downlink CRI and a SSBRI, the core network device may determine a DL-AoD based on any of the PMI, the downlink CRI and the SSBRI, and then determine the first estimated location information of the UE based on the DL-AoD.

The core network device may determine the DL-AoD based on a value of the PMI, or determine the DL-AoD based on a value of the downlink CRI, or determine the DL-AoD based on a value of the SSBRI. After determining the DL-AoD, the core network device may determine the first estimated location information of the UE based on the DL-AoD.

At step 305, the core network device sends a positioning information request message to an access network device, the positioning information request message includes the first estimated location information.

At step 306, the core network device receives a positioning information response message sent by the access network device, the positioning information response message includes DL PRS resource information.

At step 307, the core network device sends positioning assistance data to the UE, the positioning assistance data includes the DL PRS resource information.

At step 308, the core network device receives a DL positioning measurement reported by the UE.

At step 309, the core network device obtains second estimated location information of the UE by calculating based on the DL positioning measurement.

In the disclosure, steps 305-309 are similar to the steps 203-207 above, which are not repeated here.

In the embodiment of the disclosure, in the case where the DL channel information is the DL CSI parameter indication information, and the core network device determines the first estimated location information of the UE based on the DL channel information, the core network device may send the DL CSI request message to the access network device accessed by the UE. The DL CSI request message is used to request to obtain the DL CSI parameter corresponding to the UE. The core network device receives the DL CSI parameter corresponding to the UE sent by the access network device accessed by the UE, and determines the first estimated location information of the UE based on the DL CSI parameter corresponding to the UE. Therefore, the core network device can obtain the DL CSI parameter from the access network device based on the DL CSI parameter indication information, determine approximate location information of the UE based on the DL CSI parameter, and notify the access network device of the approximate location information of the UE. The access network device optimally determines the DL PRS resource information based on the approximate location information of the UE, so that the core network device provides the UE with information of a DL PRS that is possible to be detected by the UE, which not only avoids wasting time-frequency resources to transmit information of a DL PRS that cannot be detected by the UE to the UE, which saves the time-frequency resources, but also enables the UE to reduce time and power consumption for measuring the DL PRS.

In some embodiments of the disclosure, the core network device may determine the first estimated location information of the UE based on a DL channel information parameter fed back by the UE.

For example, the DL channel information parameter includes a wireless beam signal RSRP. The core network device may determine a DL-AoD based on the wireless beam signal RSRP. After the DL-AoD is determined, the first estimated location information is determined based on the DL-AoD.

For example, the DL channel information parameter includes a wireless beam signal RSRP, a wireless beam signal received SNR and a wireless channel PL. The core network device can determine a DL-AoD based on the wireless beam signal RSRP, and determine a propagation delay from the access network device to the UE based on the wireless beam signal received SNR, the wireless beam channel PL and a preset PL model, and then determine the first estimated location information of the UE based on the DL-AoD and the propagation delay.

In some embodiments of the disclosure, the core network device may obtain a DL channel information parameter and a DL CSI parameter fed back by the UE, and may also determine the first estimated location information of the UE based on the DL channel information parameter and the DL CSI parameter.

For example, the core network device obtains wireless beam signal received SNRs and PMIs corresponding to multiple wireless beams fed back by the UE respectively. The core network device can determine the first estimated location information of the UE based on a PMI corresponding to a wireless beam signal with the largest wireless beam signal received SNR. Therefore, the first estimated location information of the UE is determined based on the DL channel information parameter and the DL CSI parameter, so that the accuracy of the first estimated location information can be improved.

For example, after the UE sends received SNRs and PMIs of three wireless beams to the core network device. The core network device can select a wireless beam with the largest received SNR and determine the first estimated location information of the UE based on a PMI corresponding to the wireless beam with the largest received SNR.

When positioning the UE, the core network device may determine a location of the UE based on positioning measurement values obtained through DL PRS measurements performed for multiple access network devices by the UE. On the basis, in some embodiments of the disclosure, when the core network device sends the positioning information request message to the access network device, it may send the positioning information request message to each access network device to which the core network device is currently connected. Each access network device currently connected to the core network device can obtain the first estimated location information of the UE, and each access network device can determine corresponding DL PRS resource information based on the first estimated location information, and send the DL PRS resource information to the core network device. The core network device may provide the DL PRS resource information sent by each base station to the UE, so that the UE may measure the DL PRS based on the DL PRS resource information determined by each base station based on the first estimated location information.

That is, the core network device can send the positioning information request message to other access network devices currently connected with the core network device, in addition to the access network device accessed by the UE.

For example, there are three base stations currently connected to the core network device, one of which is a base station currently accessed by the UE. The core network device may send the location information request message to the three base stations respectively, so that each base station may determine the DL PRS resource information based on the approximate location information of the UE and send the determined DL PRS resource information to the core network device. The core network device may provide the DL PRS resource information sent by each base station to the UE, so that the UE can measure the DL PRS based on the obtained DL PRS resource information.

Figure 4:
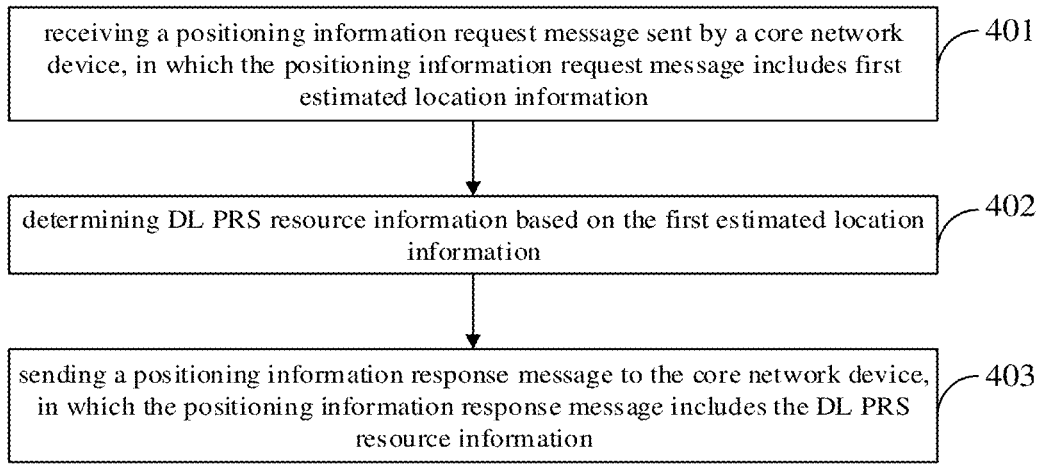
FIG. 4 is a flowchart of a method for positioning based on DL channel information according to an embodiment of the disclosure.

FIG. 4 is a flowchart of a method for positioning based on DL channel information according to an embodiment of the disclosure. The method for positioning based on DL channel information is applied to an access network device.

As illustrated in FIG. 4, the method for positioning based on DL channel information includes the following steps.

At step 401, the access network device receives a positioning information request message sent by a core network device, the positioning information request message includes first estimated location information.

In the disclosure, after determining the first estimated location information based on the DL channel information fed back by the UE, the core network device can send the positioning information request message to the access network device. The access network device receives the positioning information request message sent by the core network device. The positioning information request message includes the first estimated location information.

In the disclosure, the UE can be a cell phone, a wearable device, a vehicle terminal and other devices, the core network device can be an LMF, and the access network device can be a base station.

At step 402, the access network device determines DL PRS resource information based on the first estimated location information.

The access network device can determine a DL PRS that is possible to be detected by the UE based on beam directions and beam width of its DL PRS, and the first estimated location information of the UE, such as a DL PRS whose beam direction is facing the UE, or a DL PRS whose beam direction is within a preset angle range of the UE. The access network device determines the DL PRS resource information based on the DL PRS that may be possibly detected by the UE. It is understood that the DL PRS resource information includes information about the DL PRS of the access network device that is possible to be detected by the UE.

In some embodiments, the DL PRS resource information may include one or more of the followings: quantity, a cycle, a bandwidth, and beam information of a DL PRS resource.

At step 403, the access network device sends a positioning information response message to the core network device, the positioning information response message includes the DL PRS resource information.

In the disclosure, the access network device may send the positioning information response message to the core network device. The positioning information response message includes the DL PRS resource information. Therefore, the core network device may receive the DL PRS resource information. Since the DL PRS resource information is determined by the access network device based on the first estimated location information of the UE, the DL PRS resource information includes information of the DL PRS that is possible to be detected by the UE. In this way, the core network device sends the information of the DL PRS that is possible to be detected by the UE to the UE, to avoid sending information of a DL PRS that cannot be detected by the UE to the UE, i.e., the redundant information of the DL PRS to the UE, thereby saving the time-frequency resources.

In the embodiment of the disclosure, the access network device receives the positioning information request message sent by the core network device, the positioning information request message includes the first estimated location information. The access network device determines the DL PRS resource information based on the first estimated location information, and sends the positioning information response message to the core network device, the positioning information response message includes the DL PRS resource information. Therefore, the access network device can determine the DL PRS resource information based on the approximate location information of the UE, the approximate location information of the UE is determined by the core network device based on the DL channel information fed back by the UE, so that the core network device provides the UE with the information of the DL PRS that is possible to be detected by the UE, which not only avoids wasting time-frequency resources to transmit the information of the DL PRS that cannot be detected by the UE to the UE, which saves the time-frequency resources, but also enables the UE to reduce time and power consumption for measuring the DL PRS.

Figure 5:
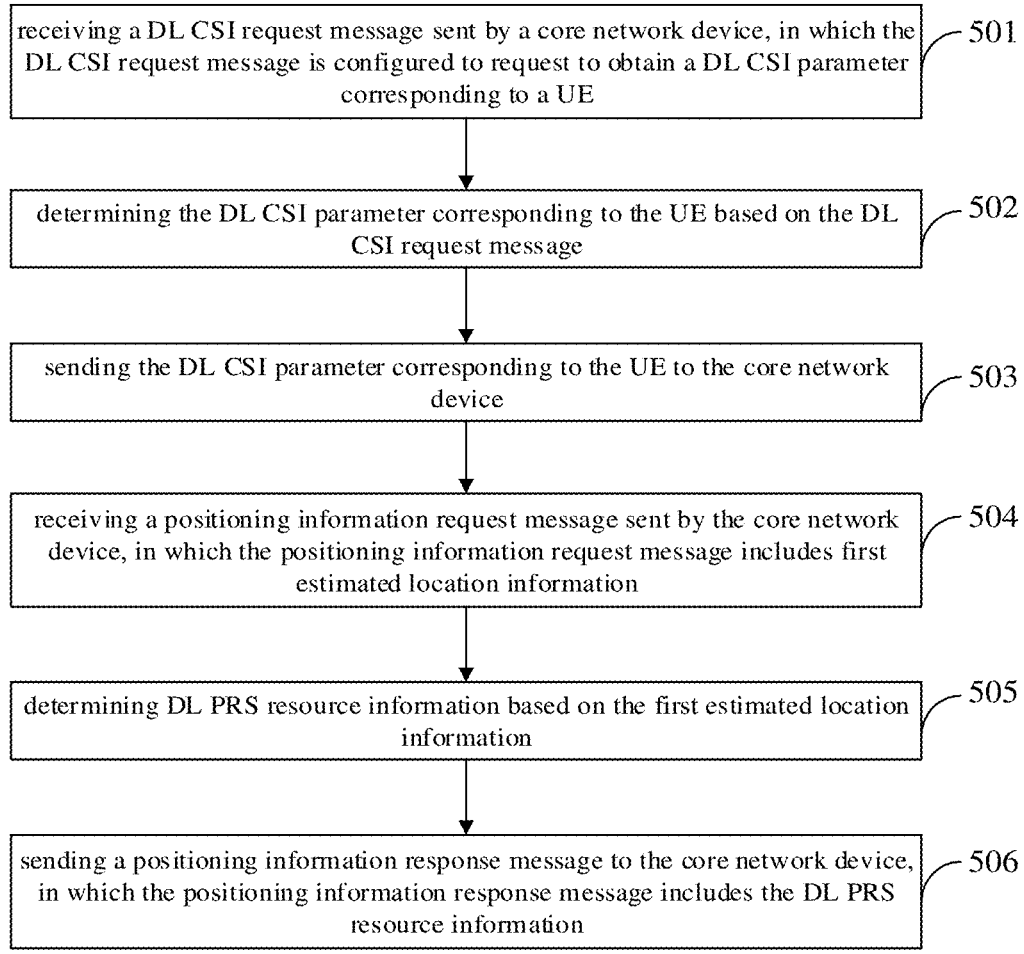
FIG. 5 is a flowchart of a method for positioning based on DL channel information according to an embodiment of the disclosure.

FIG. 5 is a flowchart of a method for positioning based on DL channel information according to an embodiment of the disclosure. The method for positioning based on DL channel information is applied to an access network device.

As illustrated in FIG. 5, the method for positioning based on DL channel information includes the following steps.

At step 501, the access network device receives a DL CSI request message sent by a core network device, the DL CSI request message is configured to request to obtain a DL CSI parameter corresponding to a UE In the disclosure, the DL channel information received by the core network device is DL CSI parameter indication information. Since the DL CSI parameter indication information is used to indicate the core network device to obtain a DL CSI parameter from an access network device accessed by the UE, the core network device can send the DL CSI request message to the access network device accessed by the UE to request for obtaining the DL CSI parameter. The access network device accessed by the UE receives the DL CSI request message sent by the core network device. The DL CSI request is used to request for obtaining the DL CSI parameter corresponding to the UE.

At step 502, the access network device determines, based on the DL CSI request message, the DL CSI parameter corresponding to the UE.

In the disclosure, the access network device accessed by the UE may determine the DL CSI parameter corresponding to the UE based on the DL CSI request message and send the DL CSI parameter corresponding to the UE to the core network device. The core network device receives the DL CSI parameter corresponding to the UE sent by the access network device accessed by the UE.

In some embodiments, the DL CSI parameter may include at least one of the followings: a PMI, a downlink CRI, and a SSBRI.

At step 503, the access network device sends the DL CSI parameter corresponding to the UE to the core network device.

In the disclosure, the access network device accessed by the UE can send the DL CSI parameter corresponding to the UE to the core network device, the core network device can determine the first estimated location information of the UE based on the DL CSI parameter corresponding to the UE.

At step 504, the access network device receives a positioning information request message sent by the core network device, the positioning information request message includes the first estimated location information.

At step 505, the access network device determines DL PRS resource information based on the first estimated location information.

At step 506, the access network device sends a positioning information response message to the core network device, the positioning information response message includes the DL PRS resource information.

In the disclosure, the steps 504-506 are similar to the steps 401-403 above, which are not repeated here.

In the embodiment of the disclosure, the access network device is the access network device accessed by the UE, the access network device accessed by the UE may receive the DL CSI request message sent by the core network device before receiving the positioning information request message sent by the core network device, the DL CSI request message is used to request for obtaining the DL CSI parameter corresponding to the UE. The access network device determines the DL CSI parameter corresponding to the UE based on the DL CSI request message, and sends the DL CSI parameter corresponding to the UE to the core network device, so that the core network device can determine the first estimated location information of the UE based on the DL CSI parameter. Therefore, the access network device accessed by the UE can determine the DL PRS resource information based on the approximate location information of the UE determined by the core network device based on the DL CSI parameter, so that the core network device provides the UE with information of a DL PRS that is possible to be detected by the UE, which not only avoids wasting time-frequency resources to transmit information of a DL PRS that cannot be detected by the UE to the UE, which saves the time-frequency resources, but also enables the UE to reduce time and power consumption for measuring the DL PRS.

Figure 6:
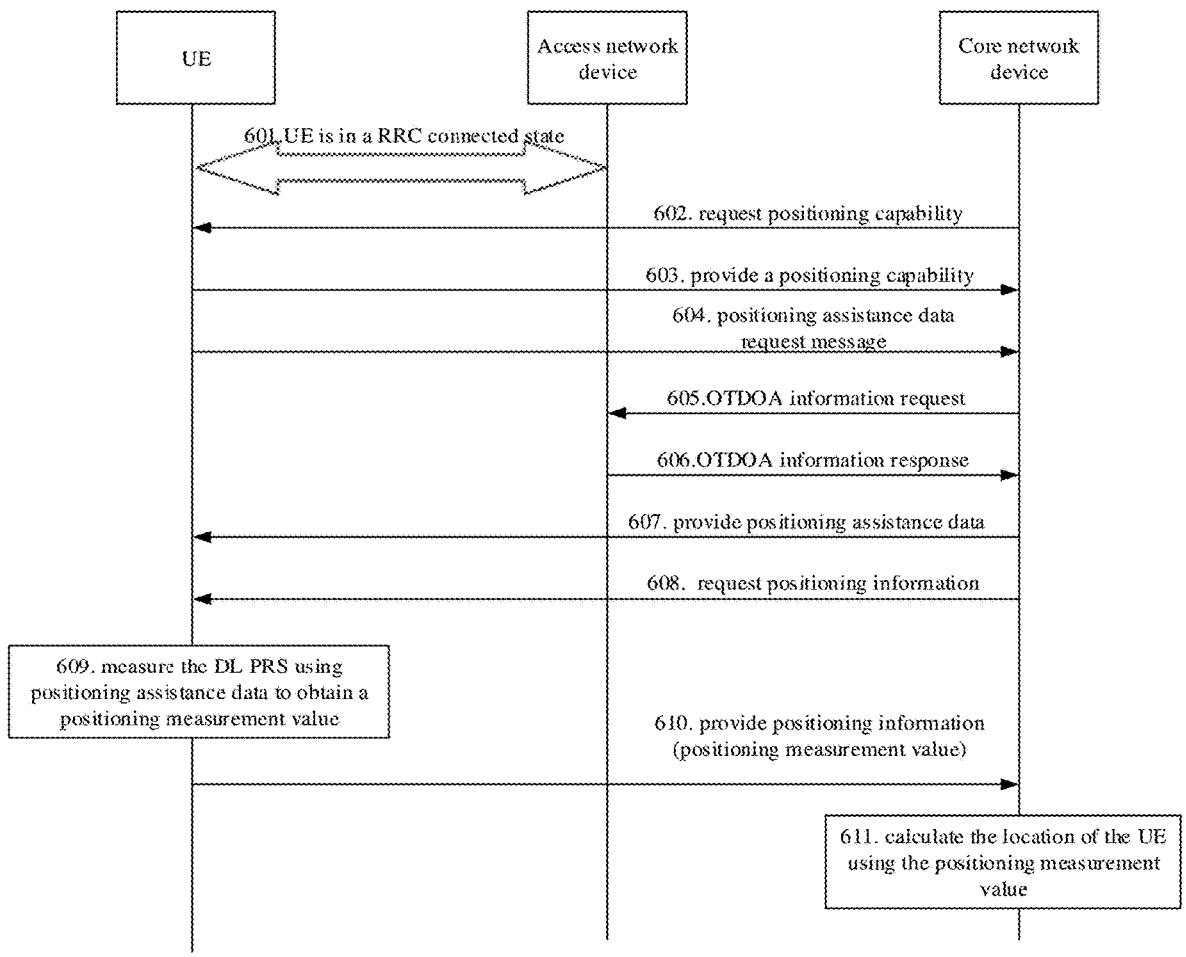
FIG. 6 is a first flowchart of a process for positioning based on DL channel information according to an embodiment of the disclosure.
Figure 7:
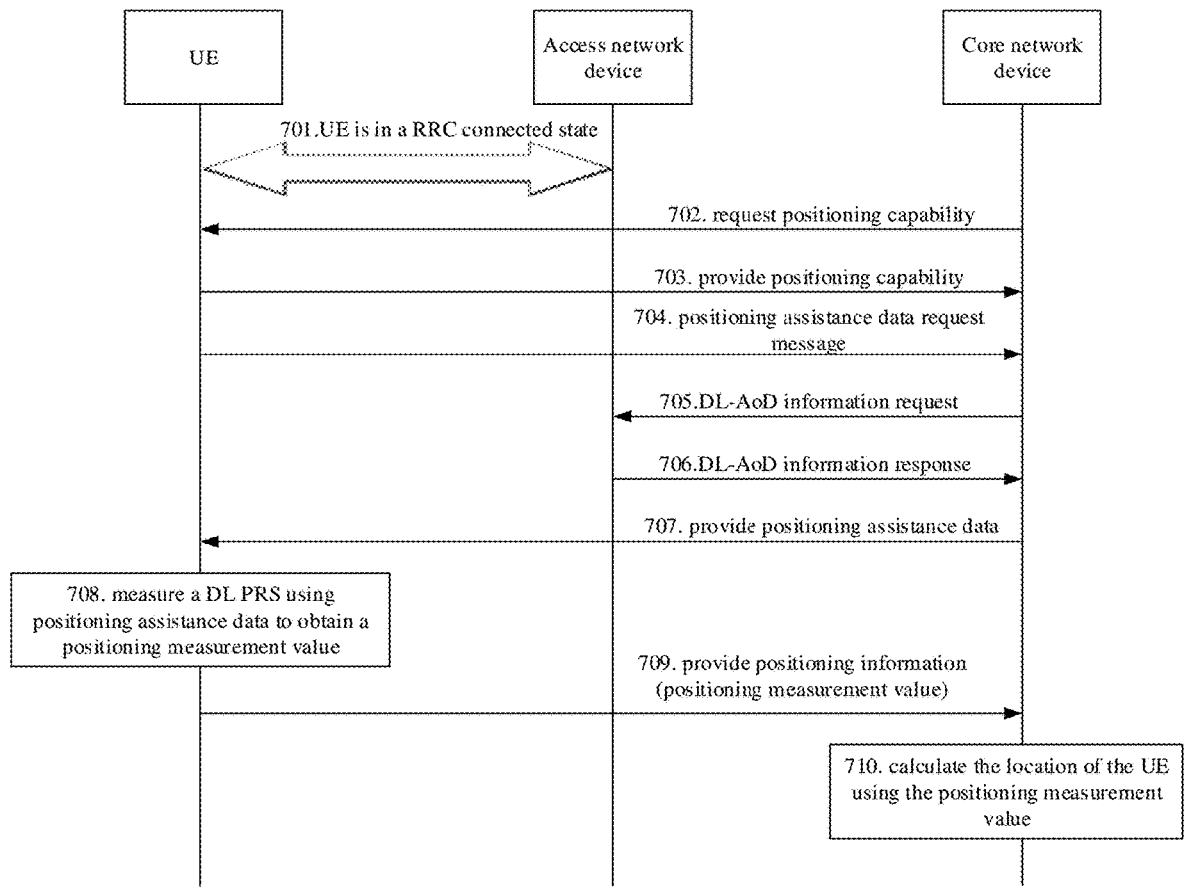
FIG. 7 is a second flowchart of a process for positioning based on DL channel information according to an embodiment of the disclosure.
Figure 8:
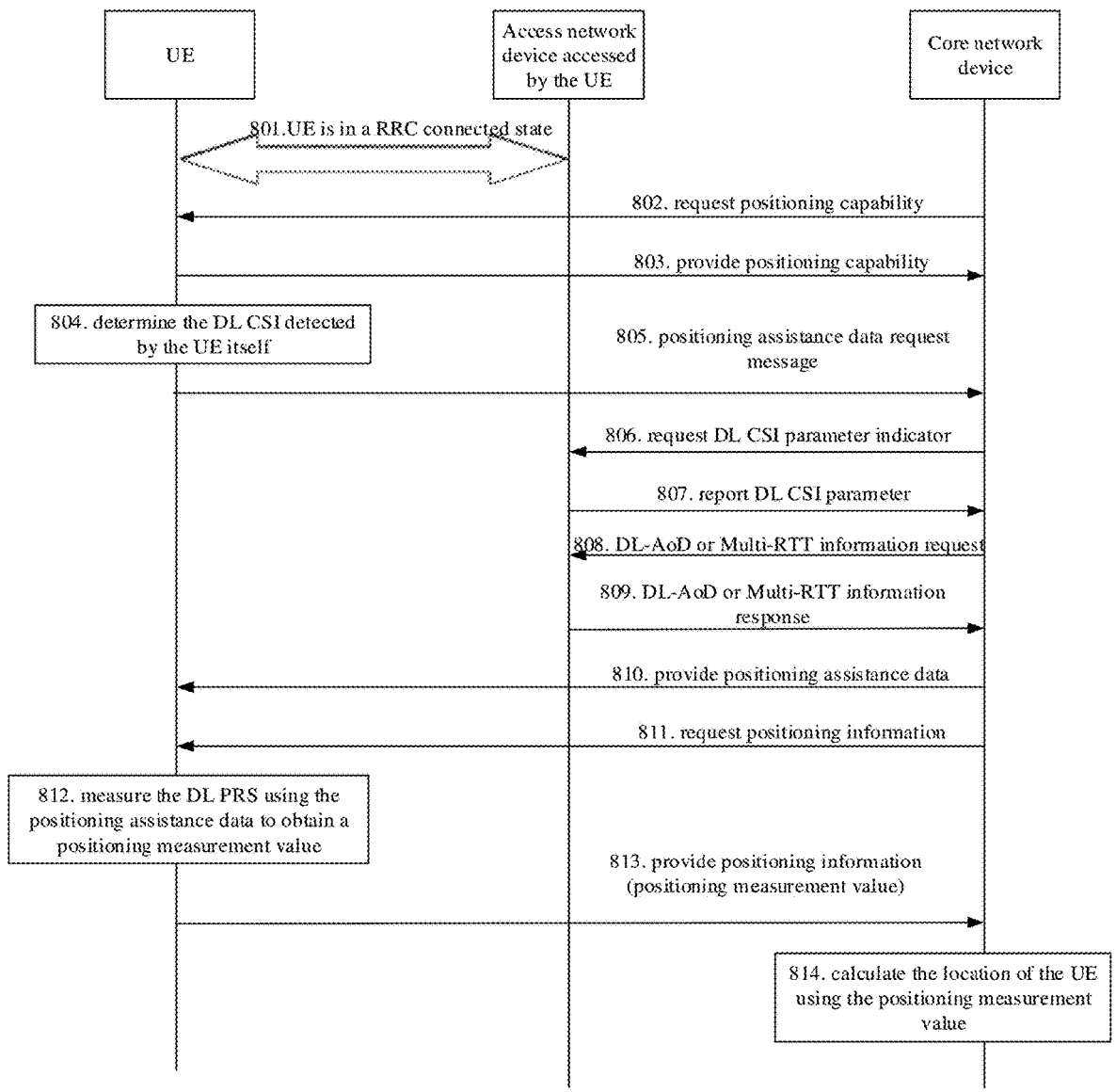
FIG. 8 is a third flowchart of a process for positioning based on DL channel information according to an embodiment of the disclosure.

To further illustrate the method for positioning based on DL channel information of the embodiments of the disclosure, FIG. 6 to FIG. 8 are used for description. Taking the DL-TDOA positioning process as an example, description is made with reference to FIG. 6 below. FIG. 6 is a first flowchart of a process for positioning based on DL channel information according to an embodiment of the disclosure.

At step 601, after the UE establishes a connection with an access network device, the UE is in a Radio Resource Control (RRC) connected state.

At step 602, a core network device sends a message "request positioning capability" to the UE, to request the UE to inform the core network device of a positioning capability that the UE can support.

At step 603, the UE sends a message "provide positioning capability" to respond to the core network device. The message "provide positioning capability" reports that the UE supports a positioning capability of 5G access network (NG-RAN) DL-TDOA.

At step 604, in the case that the UE requires downlink positioning assistance data, e.g., when the UE initiates positioning, the UE sends a positioning assistance data request message to the core network device. The message includes DL channel information. The core network device can determine first estimated location information of the UE based on the DL channel information fed back by the UE.

At step 605, the core network device sends an Observed Time Difference of Arrival (OTDOA) information request message to the access network device, the OTDOA information request message includes the first estimated location information of the UE. The access network device receives the OTDOA information request message and determines a DL PRS that is possible to be detected by the UE based on the first estimated location information of the UE, to determine DL PRS resource information.

At step 606, the access network device sends an OTDOA information response message to the core network device, the OTDOA information response message includes the DL PRS resource information.

At step 607, the core network device provides positioning assistance data to the UE, the positioning assistance data includes the DL PRS resource information.

At step 608, the core network device sends a message "request positioning information" to the UE. This message requests the UE to measure the DL PRS of the access network device and to report a measured positioning measurement value.

At step 609, the UE can measure the DL PRS using the positioning assistance data (e.g., DL PRS resource information) to obtain the positioning measurement value, such as DL RSTD.

At step 610, the UE sends a message "provide positioning information" to the core network device, the message may include the positioning measurement value obtained by measuring the DL PRS.

At step 611, the core network device uses the positioning measurement value to calculate the location of the UE.

Taking a DL-AoD positioning process as an example, illustration is made below with reference to FIG. 7. FIG. 7 is a second flowchart of a process for positioning based on DL channel information according to an embodiment of the disclosure.

Steps 701 to 704 in FIG. 7 are similar to the steps 601 to 604 above, which are not repeated here.

At step 705, the core network device sends a DL-AoD information request message to the access network device, the DL-AoD information request message includes the first estimated location information of the UE. The access network device receives the DL-AoD information request message, and determines a DL PRS that is possible to be detected by the UE based on the first estimated location information of the UE, to determine the DL PRS resource information.

At step 706, the access network device sends a DL-AoD information response message to the core network device, the DL-AoD information response message includes the DL PRS resource information.

At step 707, the core network device provides positioning assistance data to the UE, the positioning assistance data includes the DL PRS resource information.

At step 708, the UE can measure a DL PRS using the positioning assistance data (e.g., DL PRS resource information) to obtain a positioning measurement value, such as RSRP.

At step 709, the UE sends a message "provide positioning information" to the core network device, the message includes the positioning measurement value obtained by measuring the DL PRS.

At step 710, the core network device uses the positioning measurement value to calculate the location of the UE.

Taking DL-AoD or Multi-Round Trip Time (Multi-RTT) positioning process as an example, illustrating is made below with reference to FIG. 8. FIG. 8 is a third flowchart of a process for positioning based on DL channel information according to an embodiment of the disclosure.

Steps 801 to 803 in FIG. 8 are similar to the steps 601 to 603 above, which are not repeated here.

At step 804, the UE determines a DL CSI detected by itself.

At step 805, in the case that the UE requires DL positioning assistance data, e.g., when the UE initiates positioning, the UE sends a positioning assistance data request message to the core network device. The message includes the DL channel information. The DL channel information is DL CSI parameter indication information for indicating the core network device to obtain a DL CSI parameter from the access network device accessed by the UE. The core network device may determine first estimated location information of the UE based on the DL channel information fed back by the UE.

At step 806, the core network device sends a message "request a DL CSI parameter indicator" to the access network device accessed by the UE. The message includes an indicator for requesting the access network device accessed by the UE to provide the DL CSI parameter.

At step 807, the access network device accessed by the UE sends a message "report DL CSI parameter" to the core network device. The message includes the DL CSI parameter provided by the access network device accessed by the UE.

The core network device determines the first estimated location information of the UE based on the DL CSI parameter provided by the access network device accessed by the UE.

At step 808, the core network device sends a DL-AoD or Multi-RTT information request message to the access network device accessed by the UE, the information request message includes the first estimated location information of the UE. The access network device accessed by the UE receives the information request message, and determine a DL PRS that is possible to be detected by the UE based on the first estimated location information of the UE, to determine the DL PRS resource information.

At step 809, the access network device accessed by the UE sends a DL-AoD or Multi-RTT information response message to the core network device, the DL-AoD or Multi-RTT information response message includes the DL PRS resource information.

In the embodiments of the disclosure, the steps 810 to 814 are similar to the steps 607 to 611, which are not repeated here.

Figure 9:
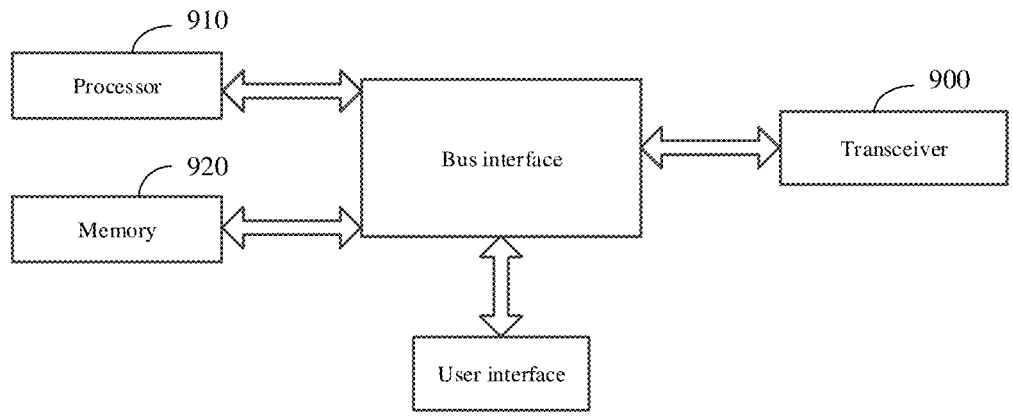
FIG. 9 is a block diagram of a User Equipment (UE) according to an embodiment of the disclosure.

In order to realize the above embodiments, the embodiment of the disclosure also provides a UE. FIG. 9 is a block diagram of a UE according to an embodiment of the disclosure.

As shown in FIG. 9, the UE includes: a transceiver 900, a processor 910, and a memory 920.

The memory 920 is configured to store computer programs, the transceiver 900 is configured to send and receive data under the control of the processor 910, and the processor 910 is configured to read the computer programs in the memory 920 and perform the following operations:

sending a positioning assistance data request message to a core network device, in which the positioning assistance data request message includes DL channel information;

receiving positioning assistance data sent by the core network device, in which the positioning assistance data includes DL PRS resource information, the DL PRS resource information is determined by an access network device based on first estimated location information of the UE forwarded by the core network device, and the first estimated location information is determined by the core network device based on the DL channel information;

obtaining a DL positioning measurement by measuring a DL PRS based on the DL PRS resource information; and sending the DL positioning measurement to the core network device.

The transceiver 900 is configured to receive and send data under the control of processor 910.

In FIG. 9, the bus architecture may include any number of interconnected buses and bridges, specifically, various circuits of one or more processors represented by the processor 910 and the memory represented by the memory 920 are linked together. The bus architecture may link peripheral devices, voltage regulators, and various other circuits such as power management circuits together, which are well known in the art and therefore will not be further described herein. The bus interface provides an interface. The transceiver 900 may include a plurality of elements, i.e., including a transmitter and a receiver, and provides units for communicating with various other devices over a transmission medium. The transmission medium includes wireless channels, wired channels, fiber optic cables, and other transmission mediums. For different UEs, the user interface can also be an interface capable to externally/internally connect to required devices, the connected devices include but are not limited to keyboards, displays, speakers, microphones, joysticks, etc.

The processor 910 is responsible for managing the bus architecture and the usual processing, and the memory 920 can store the data used by the processor 910 in performing its operations.

In some embodiments, the processor 910 may be a Central Processing Unit (CPU), an Application Specific Integrated Circuit (ASIC), a Field-Programmable Gate Array (FPGA), or a Complex Programmable Logic Device (CPLD). The processor 910 may also have a multi-core architecture.

The processor 910 is configured to execute the method of FIG. 1 provided by the embodiments of the disclosure in accordance with the obtained executable instructions by calling the computer programs stored in the memory 920. The processor 910 and the memory 920 may also be physically separately arranged.

In some embodiments, the DL channel information includes at least one of the followings: a DL channel information parameter, a DL CSI parameter, or DL CSI parameter indication information, the DL CSI parameter indication information is configured to indicate the core network device to obtain the DL CSI parameter from an access network device accessed by the UE.

In some embodiments, the DL PRS resource information may include one or more of the followings: quantity, a cycle, a bandwidth, and beam information of a DL PRS resource.

In some embodiments, sending the positioning assistance data request message to the core network device includes:

determining a target wireless beam based on a RSRP of each received wireless beam; and sending a DL channel information parameter and/or a DL CSI parameter corresponding to the target wireless beam to the core network device.

In some embodiments, before sending the positioning assistance data request message to the core network device, the method includes:

determining the DL channel information parameter and/or the DL CSI parameter based on a configured downlink reference signal.

In some embodiments, the DL channel information parameter includes at least one of the followings: a wireless channel PL, a wireless beam signal received SNR, and a wireless beam signal RSRP.

In some embodiments, the DL CSI parameter includes at least one of the followings: a PMI, a downlink CRI, and a SSBRI.

It should be noted that the above the UE provided by the embodiments of the disclosure is capable of executing all the method steps implemented in the above method embodiment of FIG. 1 above, and achieving the same technical effects, and the same parts and beneficial effects of the embodiments of the disclosure that are same as the method embodiments will not be specifically described herein.

Figure 10:
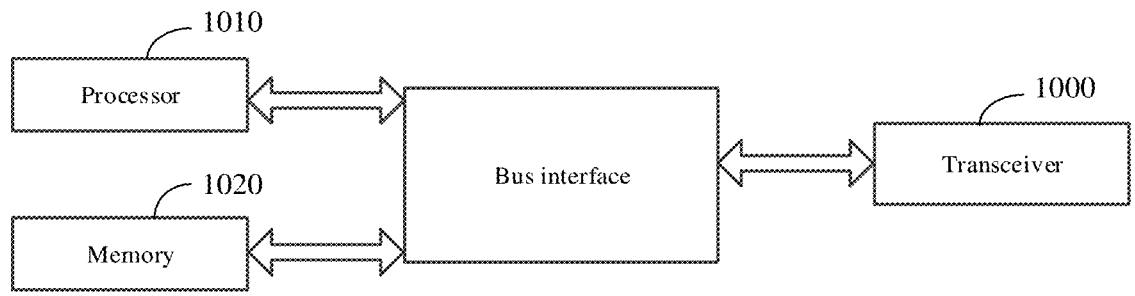
FIG. 10 is a block diagram of a network side device according to an embodiment of the disclosure.

In order to realize the above embodiments, the embodiment of the disclosure also provides a network side device. FIG. 10 is a block diagram of a network side device according to an embodiment of the disclosure. This network side device can be a core network device as mentioned in the above embodiments, such as an LMF.

As illustrated in FIG. 10, the network side device includes a transceiver 1000, a processor 1010, and a memory 1020.

The memory 1020 is configured to store computer programs. The transceiver 1000 is configured to send and receive data under the control of the processor 1010. The processor 1010 is configured to read the computer programs in the memory 1020 and perform the following operations:

receiving a positioning assistance data request message sent by a UE, in which the positioning assistance data request message includes DL channel information;

determining first estimated location information of the UE based on the DL channel information;

sending a positioning information request message to an access network device, in which the positioning information request message includes the first estimated location information;

receiving a positioning information response message sent by the access network device, in which the positioning information response message includes DL PRS resource information, and the DL PRS resource information is determined by the access network device based on the first estimated location information;

sending positioning assistance data to the UE, in which the positioning assistance data includes the DL PRS resource information;

receiving a DL positioning measurement reported by the UE; and obtaining second estimated location information of the UE by calculating based on the DL positioning measurement.

The transceiver 1000 is configured to receive and send data under the control of processor 1010.

In FIG. 10, the bus architecture may include any number of interconnected buses and bridges, specifically, various circuits of one or more processors represented by the processor 1010 and the memory represented by the memory 1020 are linked together. The bus architecture may link peripheral devices, voltage regulators, and various other circuits such as power management circuits, which are well known in the art and therefore will not be further described herein. The bus interface provides an interface. The transceiver 1000 may include a plurality of elements, i.e., including a transmitter and a receiver, and provides units for communicating with various other devices over a transmission medium. The transmission medium includes wireless channels, wired channels, fiber optic cables, and other transmission mediums. The processor 1010 is responsible for managing the bus architecture and the usual processing, and the memory 1020 can store the data used by the processor 1010 when performing operations.

The processor 1010 may be a CPU, an ASIC, a FPGA, or a CPLD. The processor 1010 may have a multi-core architecture. The processor 1010 is used to execute the method of FIGS. 2 to 3 provided by the embodiments of the disclosure in accordance with the obtained executable instructions by calling computer programs stored in the memory 1020.

In some embodiments, the DL channel information includes at least one of the followings: a DL channel information parameter, a DL CSI parameter, or DL CSI parameter indication information, the DL CSI parameter indication information is configured to indicate the core network device to obtain the DL CSI parameter from an access network device accessed by the UE.

In some embodiments, the DL channel information is the DL CSI parameter indication information, and determining the first estimated location information of the UE based on the DL channel information includes:
  sending a DL CSI request message to the access network device accessed by the UE, in which the DL CSI request message is configured to request to obtain the DL CSI parameter corresponding to the UE;
  receiving the DL CSI parameter corresponding to the UE sent by the access network device accessed by the UE; and
  determining the first estimated location information of the UE based on the DL CSI parameter corresponding to the UE.

In some embodiments, the DL channel information parameter includes a wireless beam signal RSRP, and determining the first estimated location information of the UE based on the DL channel information includes:
  determining, based on the wireless beam signal RSRP, a DL-AoD; and
  determining, based on the DL-AoD, the first estimated location information.

In some embodiments, the DL channel information parameter includes a wireless beam signal RSRP, a wireless beam signal received SNR and a wireless channel PL, and determining the first estimated location information of the UE based on the DL channel information includes:
  determining a DL-AoD based on the wireless beam signal RSRP;
  determining a propagation delay from the access network device to the UE based on the wireless beam signal received SNR and the wireless channel PL; and
  determining the first estimated location information based on the propagation delay and the DL-AoD.

In some embodiments, the DL CSI parameter includes a PMI, a downlink CRI, and a SSBRI, and determining the first estimated location information of the UE based on the DL channel information includes:
  determining a DL-AoD based on any of the PMI, the downlink CRI and the SSBRI; and
  determining the first estimated location information based on the DL-AoD.

In some embodiments, sending the positioning information request message to the access network device includes:
  sending the positioning information request message to each access network device to which the core network device is currently connected.

In some embodiments, the DL PRS resource information may include one or more of the followings: quantity, a cycle, a bandwidth, and beam information of a DL PRS resource.

It should be noted that the above-mentioned network side device provided by the embodiments of the disclosure is able to execute all the method steps implemented in the method embodiments of FIGS. 2 to 3 above, and achieve the same technical effects, and the parts and beneficial effects of this embodiment of the disclosure that are same as the method embodiment will not be specifically described here.

To achieve the above embodiments, the disclosure also provides a network side device. The network side device may be an access network device as mentioned in the above embodiments, such as a base station.

The network side device includes a memory, a transceiver, and a processor.

The memory is configured to store computer programs. The transceiver is configured to send and receive data under the control of the processor. The processor is configured to read the computer programs in the memory and perform the following operations:
  receiving a positioning information request message sent by a core network device, in which the positioning information request message includes first estimated location information;
  determining DL PRS resource information based on the first estimated location information; and
  sending a positioning information response message to the core network device, in which the positioning information response message includes the DL PRS resource information.

In some embodiments, the access network device is an access network device accessed by a UE, before receiving the positioning information request message sent by the core network device, the method further includes:
  receiving a DL CSI request message sent by the core network device, in which the DL CSI request message is configured to request to obtain a DL CSI parameter corresponding to the UE;
  determining the DL CSI parameter corresponding to the UE based on the DL CSI request message; and
  sending the DL CSI parameter corresponding to the UE to the core network device.

In some embodiments, the DL PRS resource information may include one or more of the followings: quantity, a cycle, a bandwidth, and beam information of a DL PRS resource.

It should be noted here that the above-mentioned network side device provided by the embodiments of the disclosure is able to execute all the method steps implemented in the above method embodiments of FIGS. 4 to 5, and achieve the same technical effects, and the parts and beneficial effects of this embodiment of the disclosure that are same as the method embodiment will not be specifically described here.

Figure 11:
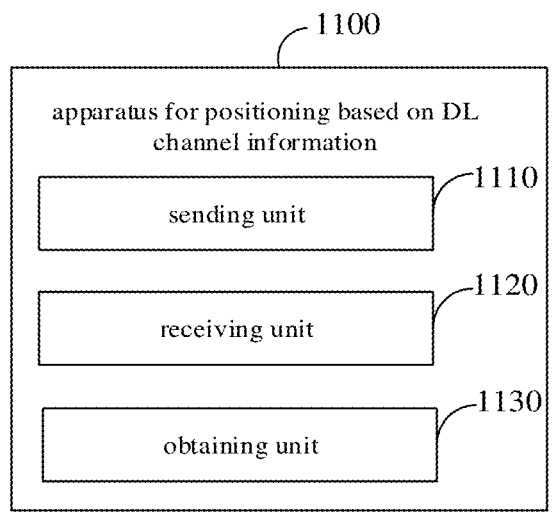
FIG. 11 is a block diagram of an apparatus for positioning based on DL channel information according to an embodiment of the disclosure.

In order to realize the above embodiments, the embodiment of the disclosure also provides an apparatus for positioning based on DL channel information. FIG. 11 is a block diagram of an apparatus for positioning based on DL channel information according to an embodiment of the disclosure. The apparatus for positioning based on DL channel information can be configured at a UE.

As illustrated in FIG. 11, the apparatus 1100 for positioning based on DL channel information includes: a sending unit 1110, a receiving unit 1120, and an obtaining unit 1130.

The sending unit 1110 is configured to send a positioning assistance data request message to a core network device, the positioning assistance data request message includes the DL channel information.

The receiving unit 1120 is configured to receive positioning assistance data sent by the core network device, the positioning assistance data includes DL PRS resource information, the DL PRS resource information is determined by an access network device based on first estimated location information of the UE forwarded by the core network device, and the first estimated location information is determined by the core network device based on the DL channel information.

The obtaining unit 1130 is configured to obtain a DL positioning measurement by measuring a DL PRS based on the DL PRS resource information.

The sending unit 1110 is further configured to send the DL positioning measurement to the core network device.

In some embodiments, the DL channel information includes at least one of the followings: a DL channel information parameter, a DL CSI parameter, or DL CSI parameter indication information, the DL CSI parameter indication information is configured to indicate the core network device to obtain the DL CSI parameter from an access network device accessed by the UE.

In some embodiments, the sending unit 1110 is configured to:
determine a target wireless beam based on a RSRP of each received wireless beam; and
send a DL channel information parameter and/or a DL CSI parameter corresponding to the target wireless beam to the core network device.

In some embodiments, the apparatus further includes a determining unit, configured to determine the DL channel information parameter and/or the DL CSI parameter based on a configured downlink reference signal.

In some embodiments, the DL PRS resource information may include one or more of the followings: quantity, a cycle, a bandwidth, and beam information of a DL PRS resource.

In some embodiments, the DL channel information parameter includes at least one of the followings: a wireless channel PL, a wireless beam signal received SNR, and a wireless beam signal RSRP.

In some embodiments, the DL CSI parameter includes at least one of the followings: a PMI, a downlink CRI, and a SSBRI.

It should be noted that the aforementioned explanatory description of the embodiments of the method for positioning based on DL channel information applied to the UE is also applicable to the apparatus for positioning based on DL channel information of this embodiment, which will not be repeated here.

In the embodiment of the disclosure, the positioning assistance data request message is sent to the core network device, the positioning assistance data request message includes the DL channel information, and the positioning assistance data sent by the core network device is received, the positioning assistance data includes DL PRS resource information. The DL PRS resource information is determined by the access network device based on the first estimated location information of the UE forwarded by the core network device. The DL PRS is measured based on the DL PRS resource information to obtain the DL positioning measurement, and the DL positioning measurement is sent to the core network device. Therefore, during positioning, the UE sends the DL channel information to the core network device through the positioning assistance data request message, the core network device determines the approximate location information of the UE based on the DL channel information and notifies the access network device of the approximate location information of the UE, and the access network device can determine the DL PRS resource information based on the approximate location information of the UE, so that the core network device provides the UE with the information of the DL PRS that is possible to be detected by the UE, which not only avoids wasting the time-frequency resources to transmit the information of the DL PRS that cannot be detected by the UE to the UE, which saves the time-frequency resources, but also enables the UE to reduce the time and power consumption for measuring the DL PRS.

Figure 12:
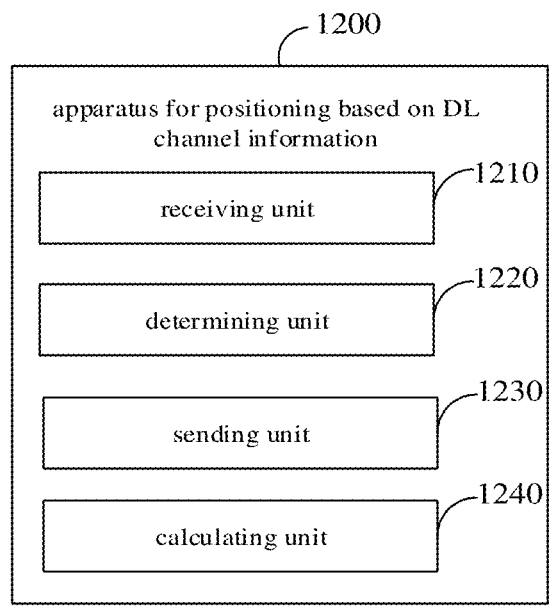
FIG. 12 is a block diagram of an apparatus for positioning based on DL channel information according to an embodiment of the disclosure.

In order to realize the above embodiments, the embodiment of the disclosure also provides an apparatus for positioning based on DL channel information. FIG. 12 is a block diagram of an apparatus for positioning based on DL channel information according to an embodiment of the disclosure. The apparatus for positioning based on DL channel information can be configured at a core network device, such as a LMF.

As illustrated in FIG. 12, the apparatus 1200 for positioning based on DL channel information includes: a receiving unit 1210, a determining unit 1220, a sending unit 1230, and a calculating unit 1240.

The receiving unit 1210 is configured to receive a positioning assistance data request message sent by a UE, the positioning assistance data request message includes the DL channel information.

The determining unit 1220 is configured to determine first estimated location information of the UE based on the DL channel information.

The sending unit 1230 is configured to send a positioning information request message to an access network device, the positioning information request message includes the first estimated location information.

The receiving unit 1210 is further configured to receive a positioning information response message sent by the access network device, the positioning information response message includes DL PRS resource information, and the DL PRS resource information is determined by the access network device based on the first estimated location information.

The sending unit 1230 is configured to send positioning assistance data to the UE, the positioning assistance data includes the DL PRS resource information.

The receiving unit 1210 is further configured to receive a DL positioning measurement reported by the UE.

The calculating unit 1240 is configured to obtain second estimated location information of the UE by calculating based on the DL positioning measurement.

In some embodiments, the DL channel information includes at least one of the followings: a DL channel information parameter, a DL CSI parameter, or DL CSI parameter indication information, the DL CSI parameter indication information is configured to indicate the core network device to obtain the DL CSI parameter from an access network device accessed by the UE.

In some embodiments, the DL channel information is the DL CSI parameter indication information, and the determining unit 1220 is configured to:
- send a DL CSI request message to the access network device accessed by the UE, the DL CSI request message is configured to request to obtain a DL CSI parameter corresponding to the UE;
- receive the DL CSI parameter corresponding to the UE sent by the access network device accessed by the UE; and
- determine the first estimated location information of the UE based on the DL CSI parameter corresponding to the UE.

In some embodiments, the DL channel information parameter includes a wireless beam signal RSRP, and the determining unit 1220 is configured to:
- determine, based on the wireless beam signal RSRP, a DL AoD; and
- determine, based on the DL-AoD, the first estimated location information.

In some embodiments, the DL channel information parameter includes a wireless beam signal RSRP, a wireless beam signal received SNR and a wireless channel PL, and the determining unit 1220 is configured to:
- determine a DL-AoD based on the wireless beam signal RSRP;
- determine a propagation delay from the access network device to the UE based on the wireless beam signal received SNR and the wireless channel PL; and
- determine the first estimated location information based on the propagation delay and the DL-AoD.

In some embodiments, the DL CSI parameter includes a PMI, a downlink CRI, and a SSBRI, and the determining unit 1220 is configured to:
- determine a DL-AoD based on any of the PMI, the downlink CRI and the SSBRI; and
- determine the first estimated location information based on the DL-AoD.

In some embodiments, the sending unit 1230 is configured to send the positioning information request message to each access network device to which the core network device is currently connected.

In some embodiments, the DL PRS resource information may include one or more of the followings: quantity, a cycle, a bandwidth, and beam information of a DL PRS resource.

It should be noted that the aforementioned explanatory description of the method for positioning based on DL channel information applied to a core network device is also applicable to the apparatus for positioning based on DL channel information of this embodiment, which will not be repeated here.

In the embodiment of the disclosure, the core network device receives the positioning assistance data request message sent by the UE, the positioning assistance data request message includes the DL channel information. The core network device determines the first estimated location information of the UE based on the DL channel information, sends the positioning information request message to the access network device, the positioning information request message includes the first estimated location information, and receives the positioning information response message sent by the access network device, the positioning information response message includes the DL PRS resource information. The DL PRS resource information is determined by the access network device based on first estimated location information. The core network device sends the positioning assistance data to the UE, the positioning assistance data includes the DL PRS resource information, receives the DL positioning measurement reported by the UE, and calculates the second estimated location information of the UE based on the DL positioning measurement. Therefore, the core network device can determine the approximate location information of the UE based on the DL channel information fed back by the UE and notify the access network device of the approximate location information of the UE, the access network device can optimally determine the DL PRS resource information based on the approximate location information of the UE, so that the core network device provides the UE with information of a DL PRS that is possible to be detected by the UE, which not only avoids wasting the time-frequency resources to transmit the information of the DL PRS that cannot be detected by the UE to the UE, which saves the time-frequency resources, but also enables the UE to reduce the time and power consumption for measuring the DL PRS.

Figure 13:
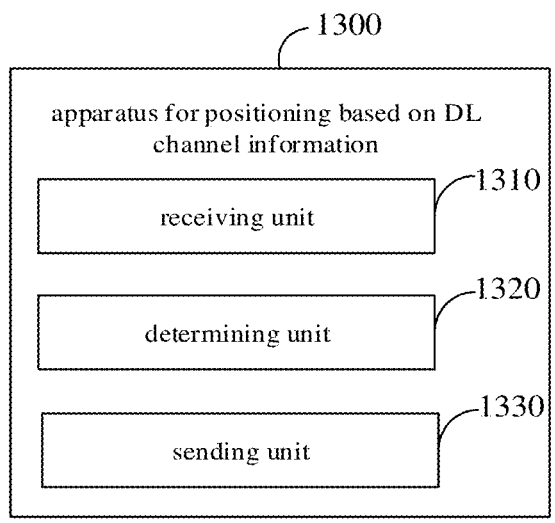
FIG. 13 is a block diagram of an apparatus for positioning based on DL channel information according to an embodiment of the disclosure.

In order to realize the above embodiments, the embodiment of the disclosure also provides an apparatus for positioning based on DL channel information. FIG. 13 is a block diagram of an apparatus for positioning based on DL channel information according to an embodiment of the disclosure.

As illustrated in FIG. 13, the apparatus 1300 for positioning based on DL channel information includes: a receiving unit 1310, a determining unit 1320, and a sending unit 1330.

The receiving unit 1310 is configured to receive a positioning information request message sent by a core network device, the positioning information request message includes first estimated location information.

The determining unit 1320 is configured to determine DL PRS resource information based on the first estimated location information.

The sending unit 1330 is configured to send a positioning information response message to the core network device, the positioning information response message includes the DL PRS resource information.

In some embodiments, the access network device is an access network device accessed by a UE, the receiving unit 1310 is configured to receive a DL CSI request message sent by the core network device, the DL CSI request message is configured to request to obtain a DL CSI parameter corresponding to the UE.

The determining unit 1320 is further configured to determine, based on the DL CSI request message, the DL CSI parameter corresponding to the UE.

The sending unit 1330 is further configured to send the DL CSI parameter corresponding to the UE to the core network device.

In some embodiments, the DL PRS resource information may include at least one of the followings: quantity, a cycle, a bandwidth, and beam information of a DL PRS resource.

It should be noted that the aforementioned explanatory description of the method for positioning based on DL channel information applied to an access network device is also applicable to the apparatus for positioning based on DL channel information of this embodiment, which will not be repeated here.

In the embodiment of the disclosure, the access network device receives the positioning information request message sent by the core network device, the positioning information request message includes the first estimated location information, determines the DL PRS resource information based on the first estimated location information, and sends the positioning information response message to the core network device, the positioning information response message includes the DL PRS resource information. Therefore, the access network device can determine the DL PRS resource information based on the approximate location information of the UE determined by the core network device based on the DL channel information fed back by the UE, so that the core network device provides the UE with the information of the DL PRS that is possible to be detected by the UE, which not only avoids wasting the time-frequency resources to transmit the information of the DL PRS that cannot be detected by the UE to the UE, which saves the time-frequency resources, but also enables the UE to reduce the time and power consumption for measuring the DL PRS.

It should be noted that respective functional units in various embodiments of the disclosure can be integrated in one processing unit, or each unit can be physically present separately, or two or more units can be integrated in a single unit. The above integrated units can be implemented either in the form of hardware or in the form of software functional units.

The integrated unit, when implemented in the form of a software functional unit and sold or used as an independent product, may be stored in a processor-readable storage medium. Based on this understanding, the essence of the technical solution of the disclosure, or parts of the technical solution of the disclosure that contribute to the related art, or all or part of the technical solution of the disclosure can be embodied in the form of software products. The computer software product is stored in a storage medium and includes several instructions that can cause a computer device (which may be a personal computer, a server, or a network side device, etc.) or a processor to perform all or some of the steps of the methods of various embodiments of the disclosure. The aforementioned storage medium includes: a USB flash drive, a mobile hard drive, a Read-Only Memory (ROM), a Random Access Memory (RAM), a disk or a CD-ROM, and other mediums that can store program codes.

To implement the above embodiments, the disclosure also provides a processor-readable storage medium.

The processor-readable storage medium stores computer programs that are used to cause a processor to perform the method for positioning based on DL channel information described in the embodiment of FIG. 1 of the disclosure.

The processor-readable storage medium may be any available medium or data storage device that can be accessed by the processor, including but not limited to a magnetic memory (e.g., floppy disk, hard disk, magnetic tape, magnetic optical disk (MO), etc.), an optical memory (e.g., CD, DVD, BD, HVD, etc.), and a semiconductor memory (e.g., ROM, EPROM, EEPROM, non-volatile memory (NAND FLASH), solid state drive (SSD)), etc.

To implement the above embodiments, the disclosure also provides a processor-readable storage medium.

The processor-readable storage medium stores computer programs that are used to cause a processor to perform the method for positioning based on DL channel information described in the embodiments of FIGS. 2 to 3 of the disclosure.

The processor-readable storage medium may be any available medium or data storage device that can be accessed by the processor, including but not limited to a magnetic memory (e.g., floppy disk, hard disk, magnetic tape, magnetic optical disk (MO), etc.), an optical memory (e.g., CD, DVD, BD, HVD, etc.), and a semiconductor memory (e.g., ROM, EPROM, EEPROM, non-volatile memory (NAND FLASH), solid state drive (SSD)), etc.

To implement the above embodiments, the disclosure also provides a processor-readable storage medium.

The processor-readable storage medium stores computer programs that are used to cause a processor to perform the method for positioning based on DL channel information described in the embodiments of FIGS. 4 to 5 of the disclosure.

The processor-readable storage medium may be any available medium or data storage device that can be accessed by the processor, including but not limited to a magnetic memory (e.g., floppy disk, hard disk, magnetic tape, magnetic optical disk (MO), etc.), an optical memory (e.g., CD, DVD, BD, HVD, etc.), and a semiconductor memory (e.g., ROM, EPROM, EEPROM, non-volatile memory (NAND FLASH), solid state drive (SSD)), etc.

To implement the above embodiments, the disclosure further provides a computer program product including computer program codes. When the computer program codes are running on a computer, the method for positioning based on DL channel information described in the embodiment of FIG. 1 of the disclosure is implemented.

To implement the above embodiments, the disclosure further provides a computer program product including computer program codes. When the computer program codes are running on a computer, the method for positioning based on DL channel information described in the embodiments of FIGS. 2 to 3 of the disclosure is implemented.

To implement the above embodiments, the disclosure further provides a computer program product including computer program codes. When the computer program codes are running on a computer, the method for positioning based on DL channel information described in the embodiments of FIGS. 4 to 5 of the disclosure is implemented.

To implement the above embodiments, the disclosure further provides a computer program including computer program codes. When the computer program codes are running on a computer, the computer is caused to implement the method for positioning based on DL channel information described in the embodiment of FIG. 1 of the disclosure.

To implement the above embodiments, the disclosure further provides a computer program including computer program codes. When the computer program codes are running on a computer, the computer is caused to implement the method for positioning based on DL channel information described in the embodiments of FIGS. 2 to 3 of the disclosure.

To implement the above embodiments, the disclosure further provides a computer program including computer program codes. When the computer program codes are running on a computer, the computer is caused to implement the method for positioning based on DL channel information described in the embodiments of FIGS. 4 to 5 of the disclosure.

In the description of the disclosure, the terms "first" and "second" are used for descriptive purposes only, and are not to be construed as indicating or implying relative importance or implicitly specifying the number of technical features indicated. Therefore, the features specified with "first" and "second" may explicitly or implicitly include at least one such feature. In the description of the disclosure, "plurality" means at least two, such as two, three, etc., unless otherwise clearly and specifically defined.

All embodiments of the disclosure can be performed alone or in combination with other embodiments, and are considered to be within the scope of protection claimed of the disclosure.

What is claimed is:

1. A method for positioning based on Downlink (DL) channel information, performed by a User Equipment (UE), comprising:
sending a positioning assistance data request message to a core network device, wherein the positioning assistance data request message comprises the DL channel information;
receiving positioning assistance data sent by the core network device, wherein the positioning assistance data comprises DL Positioning Reference Signal (PRS) resource information, the DL PRS resource information is determined by an access network device based on first estimated location information of the UE forwarded by the core network device, and the first estimated location information is determined by the core network device based on the DL channel information;
obtaining a DL positioning measurement by measuring a DL PRS based on the DL PRS resource information; and
sending the DL positioning measurement to the core network device.

2. The method of claim 1, wherein the DL channel information comprises at least one of the followings: a DL channel information parameter, a DL Channel State Information (CSI) parameter, or DL CSI parameter indication information, wherein the DL CSI parameter indication information is configured to indicate the core network device to obtain the DL CSI parameter from an access network device accessed by the UE.

3. The method of claim 2, wherein sending the positioning assistance data request message to the core network device comprises:
determining a target wireless beam based on a Reference Signal Received Power (RSRP) of each received wireless beam; and
sending at least one of a DL channel information parameter and a DL CSI parameter corresponding to the target wireless beam to the core network device.

4. The method of claim 2, comprising:
determining the at least one of the DL channel information parameter and the DL CSI parameter based on a configured downlink reference signal.

5. The method of claim 2, wherein the DL channel information parameter comprises at least one of the followings: a wireless channel Path Loss (PL), a wireless beam signal received Signal-to-Noise Ratio (SNR), and a wireless beam signal RSRP.

6. The method of claim 2, wherein the DL CSI parameter comprises at least one of the followings: a Precoding Matrix Indicator (PMI), a downlink Channel State Information Reference Signal Resource Indicator (CRI), and a Synchronization Signal Block Resource Indicator (SSBRI).

7. A User Equipment (UE), comprising a memory, a transceiver, and a processor, wherein
the memory is configured to store computer programs; the transceiver is configured to send and receive data under control of the processor; and the processor is configured to read the computer programs in the memory and perform method for positioning based on the DL channel information of claim 1.

8. A non-transitory processor-readable storage medium having computer programs stored thereon, wherein the computer programs are configured to cause a processor to implement the method for positioning based on the DL channel information of claim 1.

9. A method for positioning based on Downlink (DL) channel information, performed by a core network device, comprising:
receiving a positioning assistance data request message sent by a User Equipment (UE), wherein the positioning assistance data request message comprises the DL channel information;
determining first estimated location information of the UE based on the DL channel information;
sending a positioning information request message to an access network device, wherein the positioning information request message comprises the first estimated location information;
receiving a positioning information response message sent by the access network device, wherein the positioning information response message comprises DL Positioning Reference Signal (PRS) resource information, and the DL PRS resource information is determined by the access network device based on the first estimated location information;
sending positioning assistance data to the UE, wherein the positioning assistance data comprises the DL PRS resource information;
receiving a DL positioning measurement reported by the UE; and
obtaining second estimated location information of the UE by calculating based on the DL positioning measurement.

10. The method of claim 9, wherein the DL channel information comprises at least one of the followings: a DL channel information parameter, a DL Channel State Information (CSI) parameter, or DL CSI parameter indication information, wherein the DL CSI parameter indication information is configured to indicate the core network device to obtain the DL CSI parameter from an access network device accessed by the UE.

11. The method of claim 10, wherein the DL channel information is the DL CSI parameter indication information, and determining the first estimated location information of the UE based on the DL channel information comprises:
sending a DL CSI request message to the access network device accessed by the UE, wherein the DL CSI request message is configured to request to obtain a DL CSI parameter corresponding to the UE;
receiving the DL CSI parameter corresponding to the UE sent by the access network device accessed by the UE; and
determining the first estimated location information of the UE based on the DL CSI parameter corresponding to the UE.

12. The method of claim 10, wherein the DL channel information parameter comprises a wireless beam signal Reference Signal Received Power (RSRP), and determining the first estimated location information of the UE based on the DL channel information comprises:
determining a DL Angle of Departure (AoD) based on the wireless beam signal RSRP; and
determining the first estimated location information based on the DL AoD.

13. The method of claim 10, wherein the DL channel information parameter comprises a wireless beam signal RSRP, a wireless beam signal received Signal-to-Noise Ratio (SNR) and a wireless channel Path Loss (PL), and determining the first estimated location information of the UE based on the DL channel information comprises:
determining a DL AoD based on the wireless beam signal RSRP;

determining a propagation delay from the access network device to the UE based on the wireless beam signal received SNR and the wireless channel PL; and determining the first estimated location information based on the propagation delay and the DL AoD.

14. The method of claim 10, wherein the DL CSI parameter comprises a Precoding Matrix Indicator (PMI), a downlink Channel State Information Reference Signal Resource Indicator (CRI), and a Synchronization Signal Block Resource Indicator (SSBRI), and determining the first estimated location information of the UE based on the DL channel information comprises:

determining a DL AoD based on any of the PMI, the downlink CRI and the SSBRI; and determining the first estimated location information based on the DL AoD.

15. The method of claim 9, wherein sending the positioning information request message to the access network device comprises:

sending the positioning information request message to each access network device to which the core network device is currently connected.

16. A network side device, comprising a memory, a transceiver, and a processor, wherein the memory is configured to store computer programs; the transceiver is configured to send and receive data under control of the processor; and the processor is configured to read the computer programs in the memory and perform the method for positioning based on the DL channel information of claim 9.

17. A non-transitory processor-readable storage medium having computer programs stored thereon, wherein the computer programs are configured to cause a processor to implement the method for positioning based on the DL channel information of claim 9.

18. A method for positioning based on Downlink (DL) channel information, performed by an access network device, comprising:

receiving a positioning information request message sent by a core network device, wherein the positioning information request message comprises first estimated location information;

determining DL Positioning Reference Signal (PRS) resource information based on the first estimated location information; and sending a positioning information response message to the core network device, wherein the positioning information response message comprises the DL PRS resource information.

19. The method of claim 18, wherein the access network device is an access network device accessed by a User Equipment (UE), the method further comprises:

receiving a DL Channel State Information (CSI) request message sent by the core network device, wherein the DL CSI request message is configured to request to obtain a DL CSI parameter corresponding to the UE;

determining the DL CSI parameter corresponding to the UE based on the DL CSI request message; and sending the DL CSI parameter corresponding to the UE to the core network device.

20. A network side device, comprising a memory, a transceiver, and a processor, wherein the memory is configured to store computer programs; the transceiver is configured to send and receive data under control of the processor; and the processor is configured to read the computer programs in the memory and perform the method for positioning based on the DL channel information of claim 18.

* * * * *